United States Patent
Honda et al.

(10) Patent No.: US 12,104,093 B2
(45) Date of Patent: Oct. 1, 2024

(54) ADHESIVE AGENT AND ADHESIVE TAPE USING SAID ADHESIVE AGENT

(71) Applicant: DENKA COMPANY LIMITED, Tokyo (JP)

(72) Inventors: Yuto Honda, Tokyo (JP); Fumio Ogata, Chiba (JP); Daisuke Yoshimura, Chiba (JP); Syota Sawamura, Chiba (JP)

(*) Notice: Subject to any disclaimer, the term of this patent is extended or adjusted under 35 U.S.C. 154(b) by 943 days.

(21) Appl. No.: 17/253,045

(22) PCT Filed: Jul. 4, 2019

(86) PCT No.: PCT/JP2019/026679
§ 371 (c)(1),
(2) Date: Dec. 16, 2020

(87) PCT Pub. No.: WO2020/026697
PCT Pub. Date: Feb. 6, 2020

(65) Prior Publication Data
US 2021/0261834 A1    Aug. 26, 2021

(30) Foreign Application Priority Data
Aug. 3, 2018  (JP) .................. 2018-146789

(51) Int. Cl.
| | | |
|---|---|---|
| *C09J 7/32* | (2018.01) | |
| *C09J 7/24* | (2018.01) | |
| *C09J 7/38* | (2018.01) | |
| *C09J 153/02* | (2006.01) | |

(52) U.S. Cl.
CPC ............ *C09J 153/02* (2013.01); *C09J 7/245* (2018.01); *C09J 7/387* (2018.01); *C09J 2427/006* (2013.01); *C09J 2453/00* (2013.01); *Y10T 428/2883* (2015.01)

(58) Field of Classification Search
None
See application file for complete search history.

(56) References Cited

U.S. PATENT DOCUMENTS

2016/0289505 A1    10/2016    Harada et al.

FOREIGN PATENT DOCUMENTS

| JP | 860104142 A | 6/1985 |
|---|---|---|
| JP | 663275685 A | 11/1988 |
| JP | H813957 B2 * | 2/1996 |
| JP | 2002302660 A | 10/2002 |
| JP | 2003183610 A | 7/2003 |
| JP | 2006002102 A | 1/2006 |
| JP | 2016194042 A | 11/2016 |

OTHER PUBLICATIONS

Machine translation of JP H0813957 B2, "Aqueous Adhesive Composition", Feb. 14, 1996 (Year: 1996).*
Istvan, Benedek et al., "Pressure-Sensitive Adhesives Technology", 1997, Marcel Dekker Inc., Chapter 5, pp. 126-127 (Year: 1197).*
Hiroari, Hara et al., "Water-Based Adhesive Composition", English translation of JP813957 B, Feb. 14, 1996 (Year: 1996).*
International Search Report mailed Sep. 24, 2019, issued in corresponding International Application No. PCT/JP2019/026679, filed Jul. 4, 2019, 2 pages.

* cited by examiner

*Primary Examiner* — Anish P Desai
(74) *Attorney, Agent, or Firm* — Christensen O'Connor Johnson Kindness PLLC

(57) ABSTRACT

An object of the present invention is to provide an emulsion-based adhesive having excellent adhesive force, excellent heat resistance of adhesive force, excellent holding power, less adhesive residue and good "tack".
According to the present invention, an emulsion-based adhesive comprising: a styrene-butadiene rubber; a natural rubber; and a tackifier, wherein a gel fraction of the styrene-butadiene rubber is 20 to 60% by mass, a content of the natural rubber with respect to 100 parts by mass of the styrene-butadiene rubber is 10 to 35 parts by mass, a content of the tackifier with respect to 100 parts by mass of the styrene-butadiene rubber is 100 to 150 parts by mass, and a ratio of a styrene monomer unit in a total amount of the styrene-butadiene rubber and the natural rubber contained in the adhesive is 5 to 15% by mass, is provided.

7 Claims, No Drawings

ADHESIVE AGENT AND ADHESIVE TAPE USING SAID ADHESIVE AGENT

TECHNICAL FIELD

The present invention relates to a adhesive and a adhesive tape using the adhesive, more particularly, to a adhesive composition using a styrene-butadiene rubber and the like as a adhesive component, and a adhesive tape using the adhesive composition.

BACKGROUND ART

In general, for a polyvinyl chloride-based adhesive tape or sheet (hereinafter, also simply referred to as "adhesive tape") whose substrate is composed of polyvinyl chloride-based resin compositions, a styrene-butadiene rubber (hereinafter, "SBR") is used as a adhesive. SBR is excellent in low water absorption and aging resistance, but it has an aspect that adhesion and cohesion are somewhat low. Therefore, a adhesive including a mixture of SBR and a natural rubber as an adhesive component is widely used.

As the adhesive tape, adhesive tapes obtained by using the so-called organic solvent-based adhesive are conventionally known and excellent in adhesion and holding power.

However, volatile organic compounds have become a problem worldwide, and adhesives not containing volatile organic compounds are required. Emulsion-type adhesives are attracting attention as substitutes for organic solvent-based adhesives because they do not contain volatile organic compounds, do not require special devices for application, and are easy to store. In addition, adhesive tapes obtained by coating and drying the so-called rubber emulsion-based adhesive emulsified with natural rubbers or synthetic rubbers on various films has also been studied (Patent Literature 1).

CITATION LIST

Patent Literature

Patent Literature 1: JP2002-302660

SUMMARY OF INVENTION

Technical Problem

However, since emulsion-based adhesives have a low ability to form a gel network in constituent molecules of the adhesives, adhesive tapes obtained using the emulsion-based adhesives has low cohesion and low adhesion to corrugated surfaces. Therefore, in some cases, it has been difficult to develop sufficient adhesion as compared to adhesive tapes obtained using organic solvent-based adhesives.

In addition, to solve this problem, the adhesive force has been tried to be improved by using low molecular weight synthetic isoprene rubber latex, SBR or the like, but in some cases, adhesive residue occurs during peeling, or the holding force or tack was not good. Therefore, it was not suitable for practical use. Moreover, in some cases, the adhesive force was deteriorated by heating.

The present invention has been made in view of such circumstances, and an object of the present invention is to provide an emulsion-based adhesive having excellent adhesive force, excellent heat resistance of adhesive force, excellent holding power, less adhesive residue and good tack, and is also to provide an adhesive tape using the emulsion-based adhesive.

Solution to Problem

According to the present invention, an emulsion-based adhesive comprising: a styrene-butadiene rubber; a natural rubber; and a tackifier, wherein a gel fraction of the styrene-butadiene rubber is 20 to 60% by mass, a content of the natural rubber with respect to 100 parts by mass of the styrene-butadiene rubber is 10 to 35 parts by mass, a content of the tackifier with respect to 100 parts by mass of the styrene-butadiene rubber is 100 to 150 parts by mass, and a ratio of a styrene monomer unit in a total amount of the styrene-butadiene rubber and the natural rubber contained in the adhesive is 5 to 15% by mass, is provided.

The inventors of the present invention conducted intensive studies and found that when a styrene-butadiene rubber has a gel fraction in a certain range, and each of a natural rubber and a tackifier are contained in a certain ratio, an emulsion-based adhesive has excellent adhesive force, excellent heat resistance of adhesive force, excellent holding power, less adhesive residue and good "tack", and thus have achieved the present invention.

Hereinafter, various embodiments of the present invention will be illustrated. The embodiments shown below can be combined with one another.

(1) An emulsion-based adhesive comprising: a styrene-butadiene rubber; a natural rubber; and a tackifier, wherein a gel fraction of the styrene-butadiene rubber is 20 to 60% by mass, a content of the natural rubber with respect to 100 parts by mass of the styrene-butadiene rubber is 10 to 35 parts by mass, a content of the tackifier with respect to 100 parts by mass of the styrene-butadiene rubber is 100 to 150 parts by mass, and a ratio of a styrene monomer unit in a total amount of the styrene-butadiene rubber and the natural rubber contained in the adhesive is 5 to 15% by mass.

(2) The emulsion-based adhesive of (1), wherein the gel fraction of the styrene-butadiene rubber is 25 to 55% by mass.

(3) The emulsion-based adhesive of (1) or (2), wherein the content of the natural rubber with respect to 100 parts by mass of the styrene-butadiene rubber is 15 to 25 parts by mass.

(4) The emulsion-based adhesive of any one of (1) to (3), wherein the content of the tackifier with respect to 100 parts by mass of the styrene-butadiene rubber is 110 to 140 parts by mass.

(5) The adhesive of any one of (1) to (4), wherein the tackifier is a petroleum resin.

(6) The adhesive any one of (1) to (5), wherein the adhesive comprises a plasticizer.

(7) A adhesive tape comprising a adhesive layer on at least one surface of a substrate, wherein the adhesive layer comprises the adhesive of any one of (1) to (6).

DESCRIPTION OF EMBODIMENTS

Hereinafter, embodiments of the present invention will be described in detail. The various features shown in the embodiments described below can be combined with one another. In addition, the invention is established independently for each feature.

1. Adhesive

The emulsion-based adhesive according to an embodiment of the present invention is a composition comprising: a styrene-butadiene rubber, a natural rubber; and a tackifier, wherein a gel fraction of the styrene-butadiene rubber is 20 to 60% by mass, a content of the natural rubber with respect to 100 parts by mass of the styrene-butadiene rubber is 10 to 35 parts by mass, a content of the tackifier with respect to 100 parts by mass of the styrene-butadiene rubber is 100 to 150 parts by mass, and a ratio of a styrene monomer unit in a total amount of the styrene-butadiene rubber and the natural rubber contained in the adhesive is 5 to 15% by mass.

Each component will be described in detail below.

1-1. SBR

The adhesive according to an embodiment of the present invention contains SBR (styrene-butadiene rubber) which is a copolymer of styrene and butadiene.

The gel fraction of SBR is 20 to 60%, preferably 25 to 55%, more preferably 30 to 50%. When the gel fraction of SBR is too high, adhesion may decrease and tack may decrease. When the gel fraction of SBR is too low, adhesive residue may increase and the holding power at 40° C. may decrease.

Here, the "gel fraction of SBR" refers to the ratio of the solid content remaining undissolved under a certain immersion conditions, that is, the insoluble content. Specifically, it represents the insoluble fraction after immersion of SBR sample in toluene at normal temperature (for example, 20° C.) for 72 hours. A mass of the SBR sample before toluene immersion refers to M0. A mass of the toluene insoluble matter of the sample after immersion in toluene for 72 hours at normal temperature refers to M1. The toluene insoluble matter is a residue obtained by separating the sample after immersion by filtration through a 300 mesh wire mesh and dried at 105° C. for 1 hour. Based on these M0 and M1, the gel fraction can be calculated according to the following formula (1).

$$\text{Gel fraction (\% by mass)} = (M1/M0) \times 100 \quad (1)$$

If a plurality of types of SBR is used as SBR, the gel fraction of SBR can be calculated based on the gel fraction and content of each SBR.

In an example case where a plurality of types of SBR is used, two kinds of SBR are used, the gel fraction of one (SBR-1) is 0 to 30% and the other one (SBR-2) is 50 to 100%.

1-2. Natural Rubber

The adhesive of an embodiment of the present invention contains a natural rubber.

The adhesive contains the natural rubber of 10 to 35 parts by mass, preferably 15 to 25 parts by mass with respect to 100 parts by mass of SBR. When the content of the natural rubber is too large, the adhesive force may decrease. When the content of the natural rubber is too small, the tack may decrease and the holding power at 40° C. may decrease. In the present specification, "tack" is one of the main properties of the adhesive, and is a force that adheres to the adherend in a short time with a light force. As an evaluation method of "tack", the inclined ball tack of JIS Z0237 can be used. Moreover, there are a rolling ball tack test and a probe tack test to supplement matters related to ASTM D 2979 and JIS Z0237.

Here, the above-mentioned "natural rubber" includes a natural rubber and a natural rubber partially modified with a functional group. Examples of the natural rubber include a natural rubber latex, a natural rubber-methyl methacrylate copolymer latex, an epoxidized natural rubber latex and the like. The natural rubber is preferably the natural rubber latex, the natural rubber-methyl methacrylate copolymer latex. These may be selected and used alone, or in combination of two or more.

1-3. Tackifier

The adhesive according to an embodiment of the present invention contains, as a tackifier, a resin which can provide adhesion.

The adhesive contains a tackifier of 100 to 150 parts by mass, preferably 110 to 140 parts by mass with respect to 100 parts by mass of SBR. When the content of the tackifier is too large, the adhesive residue may increase and the holding power may decrease. When the content of the tackifier is too small, the adhesive force may decrease.

The tackifier may be selected in consideration of the softening point, the compatibility with each component, and the like. Examples of the tackifier include: a terpene resin: a rosin resin; a hydrogenated rosin resin; a coumarone-indene resin; a styrene-based resin; petroleum resins such as an aliphatic petroleum resin and an alicyclic petroleum resin; a terpene-phenol resin; a xylene resin; emulsions of other aliphatic hydrocarbon resins or aromatic hydrocarbon resins. These may be used alone, or in combination of two or more. In particular, it is preferable to use one or more types of the petroleum resins such as the aliphatic petroleum resin and the alicyclic petroleum resin, and the terpene-phenol resin, more preferably petroleum resins, and even more preferably aliphatic petroleum resins.

1-4. Styrene Monomer Unit Ratio

The ratio of a styrene monomer unit in a total amount of the styrene-butadiene rubber and the natural rubber contained in the adhesive of an embodiment of the present invention is 5 to 15% by mass, preferably 5 to 11% by mass. When the ratio of the styrene monomer unit is excessive or insufficient, the adhesive force of the adhesive tape may be insufficient.

In the present specification, "a ratio of a styrene monomer unit in a total amount of the styrene-butadiene rubber and the natural rubber contained in the adhesive" is an average value of content of styrene structures contained in styrene-butadiene rubbers and natural rubbers that are elastomers. The ratio of each structure can be determined by measuring the intensity of the resonance signal of hydrogen belonging to a styrene structure, a butadiene structure, and an isoprene structure by 1H-NMR (400 MHZ) method. Details will be described below.

1-5. Other Additives

The adhesive according to an embodiment of the present invention may contain other additives such as a plasticizer, a filler, and a lubricant as long as the effects of the present invention are not impaired.

In particular, from the viewpoint of adhesive force, holding power, adhesive residue, tack and the like, the adhesive preferably contains the plasticizer, and more preferably contains 5 to 45% by mass of the plasticizer in the adhesive.

2. Adhesive Tape

The adhesive tape according to an embodiment of the present invention has an adhesive layer in the at least one surface of a substrate, and the adhesive layer is the dry coating film of the adhesive.

2-1. Substrate

A vinyl chloride resin composition is suitable for a base material. The vinyl chloride resin composition is not particularly limited as long as it contains polyvinyl chloride. The proportion of polyvinyl chloride to the total amount of resin components of the vinyl chloride resin composition is, for example, 50% by mass or more, preferably 80% by mass or more, and even more preferably 90 to 100% by mass. In addition to the resin component, the vinyl chloride resin composition may contain known additives (for example, a stabilizer, a plasticizer, a flame retardant, and the like) as needed.

The thickness of the substrate is not particularly limited, but, for example, 10 to 500 μm, preferably 70 to 200 μm, and more preferably 80 to 160 μm. In addition, a base material may have a form of a single layer, and may have a form of a multilayer. The substrate may be subjected to various treatments such as a backside treatment, an antistatic treatment, a primer treatment, and the like, as needed.

<Method of Manufacturing Substrate>

The substrate of the present invention may be obtained by melt-kneading a resin composition in which polyvinyl chloride resins, plasticizers, inorganic fillers, heat stabilizers, light absorbers, pigments, other additives and the like are mixed. The melt-kneading method is not particularly limited, but various mixers and kneaders equipped with heating devices may be used. Examples of the mixers and kneaders include a kneader, a roll and Banbury mixer, which may be a continuous type or a batch type. The resin composition is mixed so as to be uniformly dispersed, and the resulting mixture is formed on the substrate by a calendering method, a T-die method, an inflation method or the like which is a conventional forming method. The molding machine is preferably a calender molding machine from the viewpoints of productivity, color change, and shape uniformity. As a roll arrangement method in calendering, for example, a known method such as L-type, inverted L-type, Z-type or the like may be used, and the roll temperature is usually set to 150 to 200° C., preferably 155 to 190° C.

2-2. Adhesive Layer

The thickness of the adhesive layer provided on at least one surface of the substrate is, for example, 5 to 100 μm, preferably 10 to 50 μm, and more preferably 15 to 40 μm. When the thickness is thinner than this range, the adhesive force may decrease to deteriorate the winding workability of the obtained adhesive tape. On the other hand, when the thickness is thicker than this range, coating property may be deteriorated.

The adhesive layer may be obtained, for example, by coating and drying the emulsion adhesive composition.

The adhesive tape according to an embodiment of the present invention may be obtained, for example, by coating the adhesive on one side of the substrate and sufficiently removing the solvent with a drying furnace. Examples of a coating system of the adhesive include a comma system, a lip die system, a gravure system, a roll system, a slot die system and the like.

2-3. Primer Layer

The adhesive tape according to an embodiment of the present invention, as needed, comprises a primer layer between the substrate and the adhesive layer to improve the adhesion between the substrate and the adhesive layer as long as the effects of the present invention are not impaired.

A primer for forming the primer layer is preferably a primer containing a graft polymer and an acrylonitrile-butadiene copolymer, wherein the graft polymer is obtained by graft-polymerizing methyl methacrylate to a natural rubber, and the primer contains 25 to 300 parts by mass of the acrylonitrile-butadiene copolymer with respect to 100 parts by mass of the graft polymer.

The graft polymer obtained by graft polymerizing methyl methacrylate to the natural rubber used for the primer is preferably obtained by graft polymerizing 30 to 50% by mass of methyl methacrylate to 70 to 50% by mass of the natural rubber. When the ratio of methyl methacrylate in the graft polymer is less than 30% by mass, the adhesion between the methyl methacrylate and the substrate may be deteriorated, and delamination of layers in the adhesive tape may occur. When the ratio of methyl methacrylate is more than 50% by mass, the primer itself cures and can not follow the deformation of the substrate, which may cause delamination of layers in the adhesive tape.

Examples of the acrylonitrile-butadiene copolymer used for the primer include a middle nitrile type (25 to 30% by mass of acrylonitrile, 75 to 70% by mass of butadiene), a medium-high nitrile type (31 to 35% by mass of acrylonitrile, 69 to 65% by mass of butadiene), a high nitrile type (36 to 43% by mass of acrylonitrile, 64 to 57% by mass of butadiene) and the like. These may be used alone or in combination of two or more.

The adhesive tape according to an embodiment of the present invention may be obtained, for example, by coating the primer on one side of the substrate, sufficiently removing the solvent with a drying furnace to form the primer layer, and further coating the adhesive on the dried layer. Examples of a coating system of the primer include a gravure system, a spray system, a kiss-roll system, a bar system, a knife system and the like. The thickness of the primer layer is usually 0.1 to 1 μm, more preferably 0.3 to 0.5 μm. Furthermore, an overcoating layer may be provided on the primer layer, and the thickness of the overcoating layer varies depending on the purpose of use and application etc, but is usually 5 to 50 μm, more preferably 10 to 30 μm.

2-4. Physical Properties of Adhesive Tape

<Adhesive Force>

The adhesive tape according to an embodiment of the present invention preferably has an adhesive force to SUS plate of 2.0 N/10 mm or more, more preferably 2.5 N/10 mm or more, even more preferably 3.0 N/10 mm or more.

The adhesive tape according to an embodiment of the present invention preferably has an back face adhesive force to the tape of 2.0 N/10 mm or more, more preferably 2.5 N/10 mm or more, even more preferably 3.0 N/10 mm or more.

The adhesive tape according to an embodiment of the present invention preferably has an adhesive force to SUS plate after heating at 60° C. for 120 hours is 2.0 N/10 mm or more, more preferably 2.5 N/10 mm or more. Moreover, it is preferable that the change of the adhesive normal temperature after heating to the one before heating is small, and the difference in the adhesive force to SUS plate before and after heating is preferably 0 to 0.5 N/10 mm, more preferably 0 to 0.2 N/10 mm, even more preferably 0 to 0.1 N/10 mm.

<Holding Power>

For the adhesive tape according to an embodiment of the present invention, a holding time of suspending a weight of 500 g under a condition of 40° C. is preferably 140 minutes or more, more preferably 150 minutes or more, and even more preferably 200 minutes or more.

EXAMPLES

The present invention will be described in more detail by way of the following examples. These are illustrative and do not limit the present invention thereto.

In the following examples, the following SBRs are used in combination.

(S1) T093A manufactured by JSR Corporation (gel fraction 0% by mass, styrene ratio 40% by mass)

(S2) 2108 manufactured by JSR Corporation (gel fraction 0% by mass, styrene ratio 25% by mass)

(S3) 0545 manufactured by JSR Corporation (gel fraction 80% by mass, styrene ratio 25% by mass)

(S4) Nipol LX 426 manufactured by Zeon Corporation (gel fraction 80% by mass, styrene ratio 30% by mass)

(S5) Nipol LX 111 K manufactured by Zeon Corporation (gel fraction 80% by mass, styrene ratio 0% by mass)

(S6) Nipol LX432M manufactured by Zeon Corporation (gel fraction 80% by mass, styrene proportion 15% by mass)

(S7) Nipol LX 421 manufactured by Zeon Corporation (gel fraction 80% by mass, styrene ratio 45% by mass)

(S8) Nipol LX 112 manufactured by Zeon Corporation (gel fraction 80% by mass, styrene proportion 0% by mass)

(S9) SBR (gel fraction 0% by mass, styrene ratio 70% by mass) prepared by heating Nipol LX 416 manufactured by Zeon Corporation (gel fraction 60% by mass, styrene ratio 70% by mass) in a sealed container at 120° C. for 14 days (S10) SBR (gel fraction 0% by mass, styrene ratio 70% by mass) prepared by heating Nipol LX112A2 manufactured by Zeon Corporation (gel fraction 80% by mass, styrene ratio 70% by mass) in a sealed container at 120° C. for 14 days Example 1

(1) Polyvinyl chloride resin (TH-1000, manufactured by Taiyo Vinyl Corporation, average degree of polymerization: 1000), diisononyl phthalate (DINP, manufactured by J-PLUS Co., Ltd.) as a plasticizer, and antimony trioxide (Fire Cut TOP-5, manufactured by Suzuhiro Chemical Co., Ltd.) were melt-kneaded to be uniformly dispersed by a Banbury mixer, and then a substrate having a thickness of 110 μm was produced by a calender molding machine at 165° C. of a roll temperature.

(2) An adhesive in this example contains, in the solid content mass ratio, 100 parts by mass of SBR having a gel fraction of 40% by mass, 10 parts by mass of a natural rubber latex (HALATEX, manufactured by REGITEX) as a natural rubber, 10 parts by mass of a natural rubber-methyl methacrylate graft polymer latex (MG-40S, manufactured by REGITEX), 130 parts by mass of a tackifier resin emulsion (AP1100, manufactured by Arakawa Chemical Industries, Ltd.) as a tackifier, and 30 parts by mass, with respect to 100 parts by mass of the above components of the adhesive, of a plasticizer (diisononyl phthalate, manufactured by J-PLUS Co., Ltd.) (that is, the adhesive contains 30% by mass of the plasticizer). The used SBR is a mixture of S1 and S4 in the ratio of 50:50. The tackifier resin emulsion was prepared by dissolving 75 parts by mass of an aliphatic petroleum resin (Escollets 1102, manufactured by Exxon Mobil) in 25 parts by mass of methylcyclohexane, and then adding 3.5 parts by mass of a surfactant (Emulgen 920, manufactured by Kao Corporation) and 46.5 parts by mass of water thereto. After stirring and emulsifying the mixture with a homomixer, methylcyclohexane was removed by distillation under reduced pressure to obtain the tackifier resin emulsion.

(3) The adhesive tape was prepared by coating and drying the adhesive on the substrate so that the adhesive layer has a thickness of 20 μm. The adhesive force to SUS plate, the back face adhesive force to the tape, the holding power, and the adhesive force to SUS plate after heating at 60° ° C. for 120 hours were evaluated with the prepared tape.

<Proportion of Styrene Monomer Units to Total Amount of Styrene-Butadiene Rubber and Natural Rubber Contained in Adhesive (Styrene Proportion)>

The proportion of elastomers in the adhesive (a total of the styrene-butadiene rubber and the natural rubber) was specified by gel permeation chromatography (GPC). The concentration of sample was adjusted so that the solvent (tetrahydrofuran) is 0.1 to 10 mL per 1 mg of SBR sample. Next, the mixture was filtered with an appropriate filter (for example, a membrane filter having an average pore diameter of about 0.45 μm) and injected to the measuring device of GPC. The molecular weight of the peak appearing in the chromatogram was calculated as a standard polystyrene equivalent molecular weight. The molecular weight of 30,000 or more was regarded as a molecular weight of an elastomer, and the molecular weight of less than 30,000 was regarded as a molecular weight of a tackifier and other components. The proportion of the elastomers was calculated from the ratio of the area peak of the elastomers to the area peak of the tackifier and other components (according to the following equation).

Proportion of Elastomers in Adhesive (% by mass)= (Elastomers in Adhesive)/[(Elastomers in Adhesive)+(Tackifier and Other Components)]

The proportion of styrene monomer units to the total amount of the styrene-butadiene rubber and the natural rubber was also based on the ratio of a styrene structure and a butadiene structure, an isoprene structure. The ratio of the styrene structure and the butadiene structure, the isoprene structure was determined by measuring the intensity of the resonance signal of hydrogen belonging to a styrene structure (6.6 to 7.6 ppm, A), a butadiene structure (4.7 to 5.8 ppm, B), and an isoprene structure (5.16-5.05 ppm, C) by 1H-NMR (400 MHZ) method (A, B, and C mean peak intensity).

According to these intensities, the mass composition ratio of each structure in the elastomer was calculated by the following equation.

Styrene structure:Butadiene structure:Isoprene structure=$A/5 \times 104:(B-C)/2 \times 54: C \times 68$ According to the proportion of elastomers in the adhesive and the mass composition ratio of each structure in the elastomer, the proportion of styrene monomer units to the total amount of the styrene-butadiene rubber and the natural rubber was calculated by the following equation.

Proportion of Styrene Monomer Units (% by mass)= [(Styrene Structure)/(Styrene Structure+Butadiene Structure+Isoprene Structure)]×(Proportion of Elastomers in Adhesive)×100

<Adhesive Force to SUS Plate>

The adhesive force to SUS plate was measured according to IEC 60454-3-1-5. It measured in the evaluation test room set to temperature 23±2° C. and humidity 50±5% RH.

<Back Face Adhesive Force to Tape>

The back face adhesive force to the tape was measured according to IEC 60454-3-1-5. It measured in the evaluation test room set to temperature 23±2° C. and humidity 50±5% RH.

<Adhesive Force to SUS Plate after Heating at 60° C. for 120 Hours>

The adhesive force to SUS plate after heating at 60° C. for 120 hours was measured according to IEC 60454-3-1-5. It measured in the evaluation test room set to temperature 23±2° C. and humidity 50±5% RH after heating the tape sample at 60±2° C. for 120 hours in a geer oven and cooling it at normal temperature for 12 hours.

<Back Face Adhesive Force to Tape after Heating at 60° C. for 120 Hours>

The back face adhesive force to the tape after heating at 60° C. for 120 hours was measured according to IEC 60454-3-1-5. It measured in the evaluation test room set to temperature 23±2° C. and humidity 50±5% RH after heating the tape sample at 60±2° C. for 120 hours in a geer oven and cooling it at normal temperature for 12 hours.

<Holding Power>

In Tables 1 and 2, "holding power" was a holding time measured according to JIS Z 0237, section 13 "holding power" when a weight of 500 g was suspended in a condition of 40° C.

<Adhesive Residue>

The degree of adhesive remaining on adherend surface of the sample measured according to IEC 60454-3-1-5 was evaluated as follows.
A: Not remained
B: Slightly remained
C: Remained <Tack>

The tack (gf) in each adhesive layer was evaluated as follows based on the result of measurement according to ASTM D 2979.
A: 250 gf or more
B: 100 gf or more and less than 250 gf
C: less than 100 gf Examples 2 to 15 and Comparative Examples 1 to 11

The type and blending proportion of styrene-butadiene rubbers, natural rubbers, tackifiers, plasticizers and the like were changed as shown in Tables 1 and 2, and the results of various property evaluations are shown in Tables 1 and 2.

The styrene-butadiene rubbers used were mixed at the following ratio of solid content weight fractions.
(Examples 2 and 5) S1:S4=70:30
(Example 3) S1:S4=30:70
(Examples 4, 6 to 15) S1:S4=50:50
(Comparative Example 1) S1:S4=20:80
(Comparative Example 2) S1:S4=80:20
(Comparative Examples 3 to 8) S1:S4=50:50
(Comparative Example 9) S9:S4=50:50
(Comparative Example 10) S10:S4=50:50
(Comparative Example 11) S3:S4=50:50

TABLE 1

| | | | | Example | | | | | | | | | | | | | |
|---|---|---|---|---|---|---|---|---|---|---|---|---|---|---|---|---|---|
| Table 1 | | Unit | 1 | 2 | 3 | 4 | 5 | 6 | 7 | 8 | 9 | 10 | 11 | 12 | 13 | 14 | 15 |
| Composition of Adhesive | SBR | parts | 100 | 100 | 100 | 100 | 100 | 100 | 100 | 100 | 100 | 100 | 100 | 100 | 100 | 100 | 100 |
| | Natural Rubber Latex | Natural Rubber (HALATEX, manufactured by REGITEX) | parts | 10 | 10 | 10 | 20 | — | 30 | — | 15 | 5 | 10 | 10 | 10 | 10 | 10 | 10 |
| | | Natural Rubber-Methyl Methacrylate Graft Polymer Latex (MG-40S, manufactured by REGITEX) | parts | 10 | 10 | 10 | — | 20 | — | 30 | 15 | 5 | 10 | 10 | 10 | 10 | 10 | 10 |
| | Tackifier | parts | 130 | 130 | 130 | 130 | 130 | 130 | 130 | 130 | 130 | 100 | 150 | 130 | 130 | 130 | 130 |
| | Plasticizer | parts | 107 | 107 | 107 | 107 | 107 | 111 | 111 | 111 | 103 | 94 | 116 | 44 | 167 | 0 | 250 |
| Gel Fraction of SBR | mass % | 40 | 24 | 56 | 40 | 24 | 40 | 40 | 40 | 40 | 40 | 40 | 40 | 40 | 40 | 40 |
| Styrene Proportion to Total Amount of Styrene-Butadiene Rubber and Natural Rubber | mass % | 7 | 9 | 5 | 9 | 11 | 9 | 9 | 9 | 9 | 11 | 8 | 9 | 9 | 9 | 6 |
| Plasticizer in Adhesive | mass % | 30 | 30 | 30 | 30 | 30 | 30 | 30 | 30 | 30 | 30 | 30 | 15 | 40 | 0 | 50 |
| Evaluation | Normal Temperature | Adhesive Force to SUS Plate | N/10 mm | 3.0 | 3.2 | 2.5 | 2.6 | 2.8 | 2.4 | 2.5 | 2.5 | 2.6 | 2.5 | 2.7 | 3.4 | 2.4 | 2.5 | 3.0 |
| | | Back Face Adhesive Force to Tape | N/10 mm | 3.1 | 3.0 | 2.6 | 2.8 | 3.2 | 2.3 | 2.9 | 2.9 | 3.0 | 2.6 | 2.8 | 3.5 | 2.2 | 2.6 | 3.1 |
| | 40° C. | Holding Power | min | 200 | 145 | 360 | 250 | 280 | 320 | 300 | 450 | 170 | 250 | 145 | 400 | 180 | 500 | 140 |
| | 60° C. × 120 h | Adhesive Force to SUS Plate | N/10 mm | 2.9 | 2.7 | 2.5 | 2.7 | 3.0 | 2.3 | 2.5 | 2.5 | 2.6 | 2.5 | 2.7 | 3.4 | 2.4 | 2.4 | 2.9 |
| | | Back Face Adhesive Force to Tape | N/10 mm | 3.0 | 2.5 | 2.6 | 2.7 | 3.0 | 2.2 | 2.9 | 2.9 | 3.0 | 2.6 | 2.8 | 3.5 | 2.2 | 2.5 | 3.0 |
| | | Difference in Pre-heating and Post-heating Adhesive Forces to SUS Plate | N/10 mm | 0.1 | 0.5 | 0.0 | 0.1 | 0.2 | 0.1 | 0.0 | 0.0 | 0.0 | 0.0 | 0.0 | 0.0 | 0.0 | 0.1 | 0.1 |
| | | Adhesive Residue | — | A | A | B | A | B | A | A | A | B | A | B | A | B | A | B |
| | | Tack | — | A | A | B | A | A | A | A | B | A | A | B | A | B | A |

TABLE 2

|  | Table 2 | | Unit | Comparative Example | | | | | | | | | | |
|---|---|---|---|---|---|---|---|---|---|---|---|---|---|---|
|  |  |  |  | 1 | 2 | 3 | 4 | 5 | 6 | 7 | 8 | 9 | 10 | 11 |
| Composition of Adhesive | SBR | | parts | 100 | 100 | 100 | 100 | 100 | 100 | 100 | 100 | 100 | 100 | 100 |
|  | Natural Rubber Latex | Natural Rubber (HALATEX, manufactured by REGITEX) | parts | 10 | 10 | 40 | — | 5 | — | 10 | 10 | 10 | 10 | 10 |
|  |  | Natural Rubber-Methyl Methacrylate Graft Polymer Latex (MG-40S, manufactured by REGITEX) | parts | 10 | 10 | — | 40 | — | 5 | 10 | 10 | 10 | 10 | 10 |
|  | Tackifier | | parts | 130 | 130 | 130 | 130 | 130 | 130 | 90 | 160 | 130 | 130 | 130 |
|  | Plasticizer | | parts | 64 | 107 | 116 | 116 | 101 | 101 | 90 | 120 | 107 | 107 | 107 |
|  | Gel Fraction of SBR | | mass % | 64 | 16 | 40 | 40 | 40 | 40 | 40 | 40 | 40 | 40 | 40 |
|  | Styrene Proportion to | | mass % | 5 | 9 | 7 | 7 | 7 | 7 | 9 | 6 | 16 | 1 | 3 |
|  | Plasticizer in Adhesive | | mass % | 30 | 30 | 30 | 30 | 30 | 30 | 30 | 30 | 30 | 30 | 30 |
| Evaluation | Normal Temperature | Adhesive Force to SUS Plate | N/10 mm | 1.8 | 3.6 | 1.9 | 1.7 | 3.2 | 3.3 | 1.8 | 1.7 | 1.5 | 1.6 | 1.3 |
|  |  | Back Face Adhesive Force to Tape | N/10 mm | 1.6 | 3.5 | 1.7 | 2.0 | 3.3 | 3.4 | 2.2 | 1.9 | 1.3 | 1.5 | 1.5 |
|  | 40° C. | Holding Power | min | 360 | 60 | 650 | 750 | 95 | 120 | 280 | 100 | 1000 | 500 | 700 |
|  | 60° C. × 120 h | Adhesive Force to SUS Plate | N/10 mm | 1.8 | 2.9 | 1.9 | 1.7 | 1.8 | 2.3 | 1.8 | 1.7 | 1.4 | 1.6 | 1.3 |
|  |  | Back Face Adhesive Force to Tape | N/10 mm | 1.6 | 2.7 | 1.7 | 2.0 | 1.9 | 2.5 | 2.2 | 1.8 | 1.2 | 1.5 | 1.5 |
|  | Difference in Pre-heating and Post-heating Adhesive Forces to SUS Plate | | N/10 mm | 0.0 | 0.7 | 0.0 | 0.0 | 1.4 | 1.0 | 0.0 | 0.0 | 0.1 | 0.0 | 0.0 |
|  | Adhesive Residue | | — | A | C | A | A | A | A | A | C | A | A | A |
|  | Tack | | — | C | A | A | A | C | C | B | A | A | A | A |

From the above, it is found that when a styrene-butadiene rubber has a gel fraction in a certain range, and each of a natural rubber and a tackifier are contained in a certain ratio, an emulsion-based adhesive has excellent adhesive force, excellent heat resistance of adhesive force, excellent holding power, less adhesive residue and good "tack".

INDUSTRIAL APPLICABILITY

By using the emulsion-based adhesive of the present invention, the adhesive tape having excellent adhesive force, excellent heat resistance of adhesive force, excellent holding power, less adhesive residue and good "tack" can be provided without the use of organic solvents to be volatile organic compounds. Further, the adhesive tape of the present invention can be suitably used for applications where the strong binding force is required for the uses such as high voltage cables for electrical work and wire harnesses for automobiles, and where volatile organic compounds are not preferred.

The invention claimed is:

1. An emulsion-based adhesive comprising:
a styrene-butadiene rubber;
a natural rubber; and
a tackifier, wherein
a gel fraction of the styrene-butadiene rubber is 31 to 60% by mass,
a content of the natural rubber with respect to 100 parts by mass of the styrene-butadiene rubber is 10 to 35 parts by mass,
a content of the tackifier with respect to 100 parts by mass of the styrene-butadiene rubber is 100 to 150 parts by mass, and
a ratio of a styrene monomer unit in a total amount of the styrene-butadiene rubber and the natural rubber contained in the adhesive is 5 to 15% by mass.

2. The emulsion-based adhesive of claim 1, wherein the gel fraction of the styrene-butadiene rubber is 40 to 55% by mass.

3. The emulsion-based adhesive of claim 1, wherein the content of the natural rubber with respect to 100 parts by mass of the styrene-butadiene rubber is 15 to 25 parts by mass.

4. The emulsion-based adhesive of claim 1, wherein the content of the tackifier with respect to 100 parts by mass of the styrene-butadiene rubber is 110 to 140 parts by mass.

5. The adhesive of claim 1, wherein the tackifier is a petroleum resin.

6. The adhesive of claim 1, wherein the adhesive comprises a plasticizer.

7. An adhesive tape comprising an adhesive layer on at least one surface of a substrate, wherein the adhesive layer comprises the adhesive of claim 1.

* * * * *